R. HENEAGE.
Ozone Generators.
No. 136,511. Patented March 4, 1873.
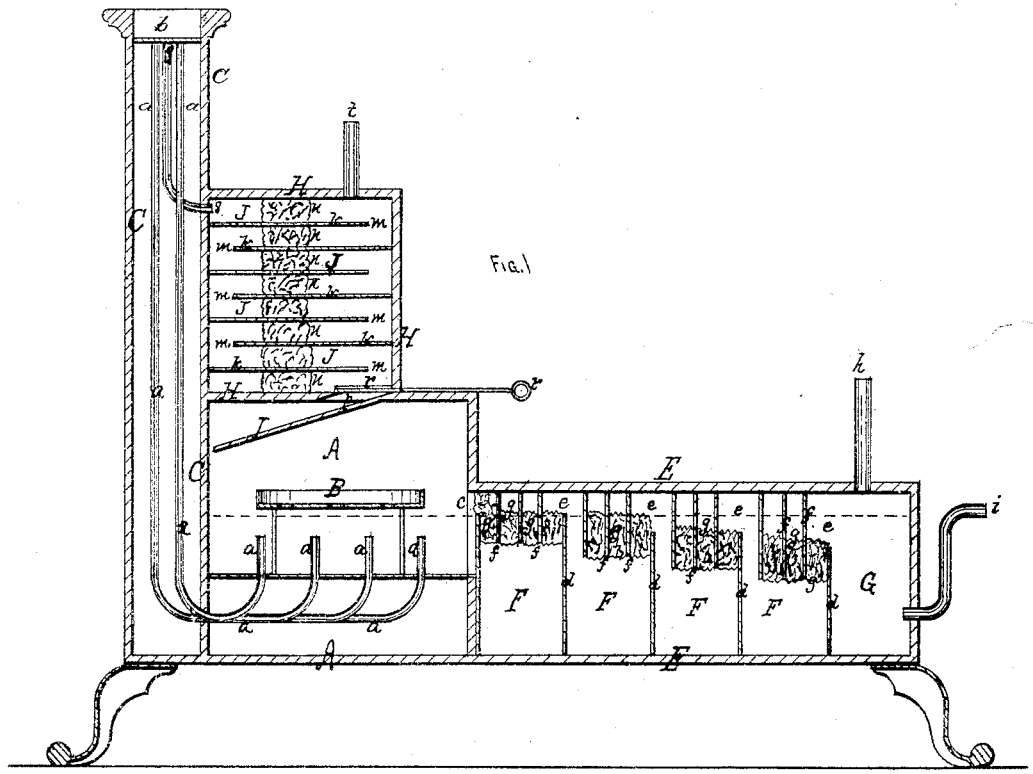
Fig.1
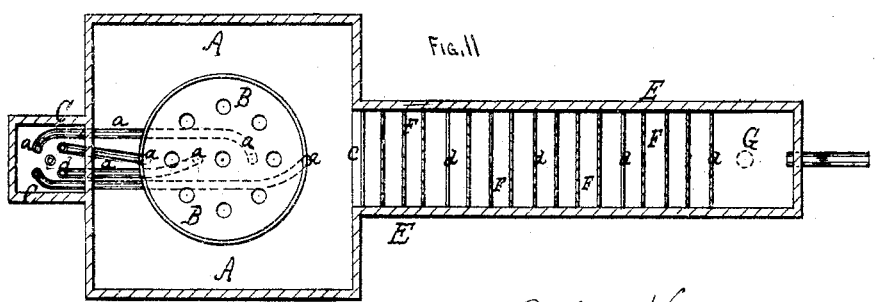
Fig.II
Witnesses.
J. R. Drake
C. N. Woodward
Robert Heneage
Inventor, by
Burke Fraser & Co
Attys.

UNITED STATES PATENT OFFICE.

ROBERT HENEAGE, OF BUFFALO, NEW YORK.

IMPROVEMENT IN OZONE-GENERATORS.

Specification forming part of Letters Patent No. 136,511, dated March 4, 1873.

*To all whom it may concern:*

Be it known that I, ROBERT HENEAGE, of Buffalo, in the county of Erie and State of New York, have invented certain new and useful Improvements in Ozone-Generators, of which the following is a specification:

This invention relates to machines or apparatus for generating ozone; and consists more particularly in the peculiar construction of the separating-chamber, whereby the ozone is more thoroughly and at the same time more quickly separated from the phosphorous acid and other impurities. The invention further consists in the method of introducing simultaneously the water and air used in generating and separating by a series of long tubes. It furthermore consists in the use of sponge or its equivalent to aid in the separation of the ozone from the phosphorous acid, &c., as hereinafter fully described.

In the drawing, Figure 1 is a sectional elevation. Fig. 2 is a plan view, also in section.

A is a glass-lined generating-chamber, in which a perforated dish or table, B, is placed to hold the chemicals from which the ozone is generated. Attached to one end of this chamber A is a long upright case, C, which forms a support and guard for a series of small tubes, $a\ a$, which commence in a small receptacle, $b$, in the top of the case C, and terminate beneath the dish B in the generating-chamber A, as shown. These tubes conduct the water and air simultaneously into the generating-chamber. The former is introduced into the small receptacle $b$ by the supply-pipe D, where, by its action, it serves to draw in and carry down with it through the tubes $a\ a$ into the generating-chamber a sufficient quantity of air to generate the ozone, and also sufficient water to absorb the acid. By this simple method the necessary supply of water and air is carried into the generating-chamber A, where the air, acting upon the phosphorus, produces phosphorous-acid gas, which contains a very large percentage of ozone, but must be separated to allow the ozone to be utilized. This is one of the main objects of this invention; and for the purpose of proper separation I provide a chamber or case, E, connected to the generating-chamber A by an opening, $c$, as shown. This separating-chamber is divided by glass partitions or plates $d$ into a number of compartments, F, leaving an opening, $e$, at the top above each plate. In the top of each compartment F is a series of smaller plates, $f$, which project downward below the line of the openings $e\ e'$, as shown. $g\ g$ represent pieces of sponge or its equivalent placed between the plates $f$ and in the openings $e\ c$ to retard the progress of the phosphorous acid and ozone, and hold them in the water a sufficient length of time to enable the water to absorb the phosphorous-acid gas while the water and ozone are allowed to pass through.

The operation is very simple, and as follows: The water falls into the shallow receptacle $b$ from the supply-pipe D, and thence down through the small tubes $a\ a$ into the generating-chamber A, as before described. This action of the water serves to draw in and carry down with it the necessary amount of air, which is discharged with the water into the generating-chamber, where it will, of course, rise to the top and, acting upon the phosphorus in the dish B, generate phosphorous-acid gas, which then, with the surplus water, flows off through the opening $c$ and sponges $g$ into the first compartment F, and when this is full the water will overflow through the opening $e$ into the second compartment F, and so on through the rest of them until it finally emerges into the last compartment G. The sponges $g$ will offer but a small resistance to the passage of the water, but will catch and hold the phosphorous-acid gas and ozone, and retain them in the water until the latter has absorbed and liquefied the acid and has thoroughly separated it from the ozone, which then passes off through the exit-pipe $h$, while the water and phosphorous acid are carried off through a siphon-shaped pipe, $i$, attached to the end of the separator E. This siphon-pipe $i$ is so formed to allow it to be turned up or down, and so raise or lower the line of the water in the machine to increase or decrease its action.

It will be observed that the division-plates $d$ gradually decrease in height as they near the exit-pipes. This is to cause a slight fall to the water in its passage from one compartment to the other to agitate it slightly and allow the ozone to escape more readily, as well as to aid the water in its flow.

By this simple arrangement a self-acting machine is produced, and ozone is not only generated, but separated from all acids, &c., and discharged in a thoroughly-pure state, and all accomplished in a very short time.

I do not wish to confine myself to the exact form of the separating-chamber shown. It may be found practicable to make the plates $d$ all of one length, or increase or decrease the number of compartments F; or the separating-chamber may be placed above the generating-chamber, as shown in Fig. 1, by placing an auxiliary separator, H, there. This chamber H is divided into a number of compartments, J, by plates $k$, having openings $m$ at the ends alternately, as shown. These compartments will be supplied with sponges $n$, similar to those in compartments F. The connection between this chamber and the generating-chamber A is formed by means of an opening, $p$, which is supplied with a sliding valve or slide, $r$, to regulate the action or to shut off the supply altogether.

I is a chute to conduct the water into the chamber below. $s$ is a small tube, similar to tubes $a\,a$, which conducts a supply of water to the separating-chamber H, where it gradually finds its way down to the bottom of the generating-chamber A.

The action of this separator is somewhat different from the other. The water for supplying the air to the generating-chamber A is introduced as before, but the exit-pipe $i$ will be attached directly to the chamber A, the separator E being removed, while the phosphorous-acid gas and ozone will pass upward (the opening $c$ being closed) into the chamber H, where, meeting the water from pipe $s$ and passing through the sponge $n$, the water will absorb the acid gas and liquefy it, and carry it back down into the generating-chamber, where it will run off with the rest of the water, &c., while the ozone will pass off through the exit-pipe $t$. This manner of separating has the advantage that the water used is always pure, and the further the ozone ascends the purer the water through which it passes.

For medicinal and other purposes it may be found desirable to reduce the ozone by the addition of common atmosphere, and in this case it may be done when the ozone passes through the separator H by utilizing the air which is introduced by the pipe $s$.

The interior of the separators and the generating-chamber will be lined entirely with glass or "mica," (isinglass,) or they may be formed entirely of glass to prevent oxidation, &c.

I do not claim, broadly, generating ozone, but mainly supplying air and water to generate and separate by means of the tubes $a$, and the manner of separation, whereby a more perfect result is obtained. I do not claim producing ozone from phosphorus under pressure of water and air, as such is shown and described in the Letters Patent of P. A. Royce, dated September 12, 1871, No. 118,976; and such I disclaim.

Claims.

I claim—

1. The method, herein described, of conducting air and water into the generating-chamber A by means of the series of upright tubes $a\,a$, whereby the necessary amount of air is simultaneously produced for generating and the water for separating, as hereinbefore specified.

2. In the separating-chamber E, the division-plates $d\,f$, whereby the compartments $e$ F G are formed, for the purposes hereinbefore fully set forth.

3. The use of sponge or its equivalent, placed in the compartments $e$ F J or their equivalents, for the purpose hereinbefore fully explained.

4. The general construction of the ozone generator and separator, consisting of the series of upright air and water tubes $a\,a$, the generating-chamber A, the separating-chamber E, with the division-plates $d\,f$ forming the compartments $e$ F G, with the water-eduction pipe $i$ and ozone-eduction pipe $h$, all arranged and operating in the manner and for the purpose specified.

5. The auxiliary separating-chamber H, with the compartments J formed by the division-plates $k$, with the sponge packing $n$, and with the induction-pipe $s$ and eduction-pipe $t$, all arranged in the manner and for the purpose substantially as specified.

6. Introducing water into the top of the auxiliary chamber H by means of the pipe $s$ or its equivalent, whereby the ozone that is generated in the chamber A beneath is separated in its passage up and through the compartments J and sponge packing $n$, as hereinbefore fully set forth.

In witness whereof I have hereunto signed my name in the presence of two subscribing witnesses.

ROBT. HENEAGE.

Witnesses:
  J. R. DRAKE,
  C. N. WOODWARD.